Patented Apr. 1, 1941

2,236,530

UNITED STATES PATENT OFFICE 2,236,530

SULPHOCARBOXYLIC ACID ESTERS OF ALCOHOL AMINE DERIVATIVES

Albert K. Epstein and Morris Katzman, Chicago, Ill., assignors to The Emulsol Corporation, Chicago, Ill., a corporation of Illinois No Drawing. Application September 28, 1939, Serial No. 296,918

18 Claims. (Cl. 260—401)

Our invention relates to a new class of chemical substances, and more in particular to a new class of chemical substances having capillary active properties and particularly adapted for use as detergents, wetting, penetrating, emulsifying, lathering, flotation and anti-spattering agents, and for frothing purposes.

The principal object of the present invention is the provision of a new class of chemical substances capable of satisfactory use in connection with the problems and fields hereinabove and hereinafter discussed.

Another object is the provision of a new class of chemical substances which are in general of relatively simple structure and can be cheaply made in commercial quantities.

Another object is the provision of a new class of chemical substances having improved wetting and detergent characteristics.

Other objects and features of the invention will be apparent from a consideration of the following detailed description.

The substances of the invention are in general esters, preferably of lower molecular weight carboxylic or fatty acids with at least one unesterified sulphonic acid group in the carboxylic or fatty acid radical, wherein the group esterified with the sulpho-carboxylic or sulpho-fatty acid contains nitrogen linked to carbon and a lipophile radical with at least four carbon atoms. In certain circumstances there may be more than one unesterified sulphonic acid group in the carboxylic or fatty acid radical or there may be sulphonic acid groups that are esterified and other sulphonic acid groups that are not esterified but in all cases there must be at least one unesterified sulphonic acid group in preferably the lower molecular weight carboxylic or fatty acid radical. The carboxylic or fatty acid radical with the unesterified sulphonic acid group is, as indicated, preferably of relatively low molecular weight and, for best results, should contain not more than eight carbons.

Considering the compounds from another aspect, the molecule in each instance contains a relatively high molecular weight lipophile group and a relatively low molecular weight hydrophile group which, in the class of compounds to which the present invention relates, are sulphonic acid radicals or free or unesterified OH groups in conjunction with a sulphonic acid radical. From still another angle, the compounds may be considered as combinations of a higher molecular weight lipophile group and a relatively low molecular weight sulpho-carboxylic or sulpho-fatty acid group. A more complete understanding of what may comprise the lipophile group and the particular character of the sulpho-carboxylic or sulpho-fatty acid group will be had as the detailed description progresses.

The function of the sulphonic acid group is to impart hydrophilic properties, that is, water wetting or water attracting properties, to the molecule as a whole. The groups which are esterified by the sulpho-carboxylic or sulpho-fatty acid are in general of a lipophile character. At times they may be strongly lipophilic and at other times moderately lipophilic. They may be of low molecular weight or of moderately high molecular weight, depending upon the purpose for which the substances may be used.

More specifically, at least most of the substances of the invention are lower molecular weight sulpho-carboxylic acid esters of alcohol primary or secondary amines, hydrogen attached to nitrogen of the alcohol primary or secondary amines being replaced by an acyl radical containing at least four and preferably from eight to eighteen carbon atoms.

Illustrative examples of compounds falling within the scope of the invention are as follows:

(1) $C_{11}H_{23}\text{—}\underset{\underset{O}{\|}}{C}\text{—NH—}C_2H_4\text{—O—}\underset{\underset{O}{\|}}{C}\text{—}CH_2\text{—SO}_3Na$ (2) $C_{13}H_{27}\text{—}\underset{\underset{O}{\|}}{C}\text{—NH—}C_2H_4\text{—O—}\underset{\underset{O}{\|}}{C}\text{—}CH_2\text{—}CH_2\text{—SO}_3K$ (3) $C_{15}H_{31}\text{—CO—NH—}C_2H_4\text{—O—}\underset{\underset{O}{\|}}{C}\text{—}CH_2\text{—SO}_3K$ (4) $C_7H_{15}\text{—}\underset{\underset{O}{\|}}{C}\text{—NH—}CH_2\text{—}CH_2\text{—}CH_2\text{—O—}\underset{\underset{O}{\|}}{C}\text{—}CH_2\text{—SO}_3NH_4$

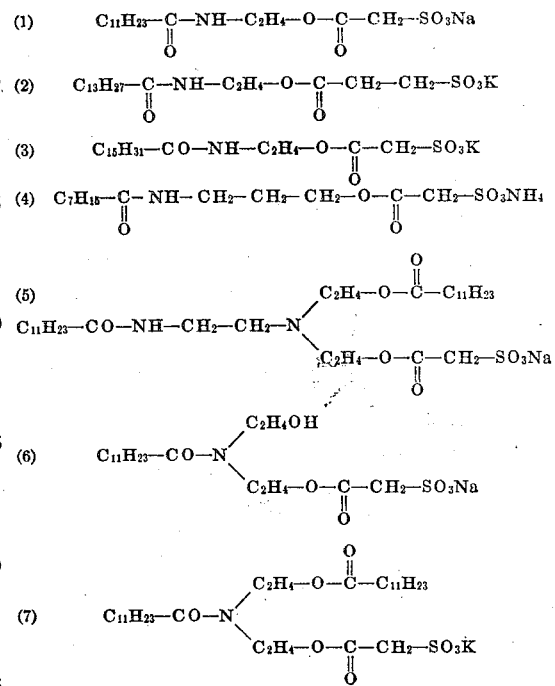

(8) 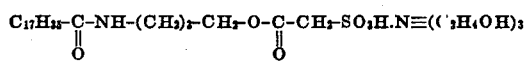

(9) 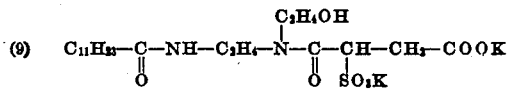

(10) $C_{11}H_{27}$—C—NH—$C_2H_4$—NH—$C_2H_4$—O—C—$CH_2$—$SO_3Na$
        ‖                                ‖
        O                                O

(11) $C_{17}H_{35}$—C—NH—$C_2H_4$—O—$C_2H_4$—O—C—$CH_2$—$SO_3K$
        ‖                                    ‖
        O                                    O

(12) 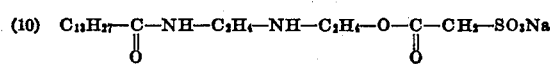

(13) 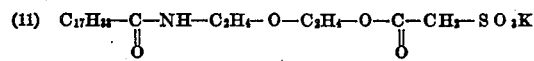

(14) 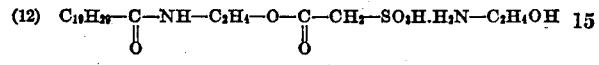

(15) 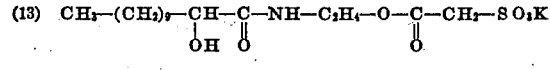

(16) 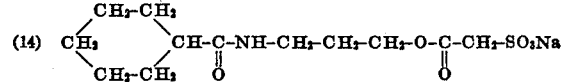

(17) 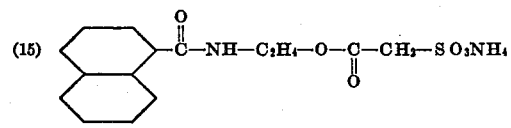

(18) 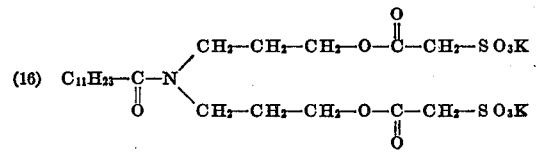

(19) 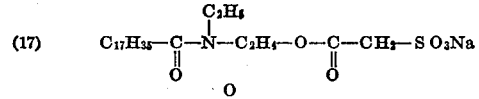

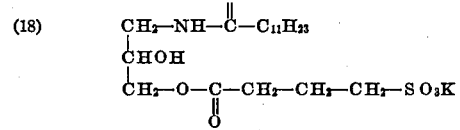

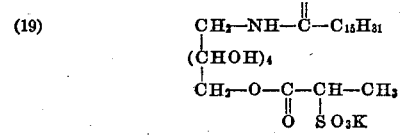

While the above examples represent single substances, it will be understood that, in practice, it is, in general, more advantageous to employ mixtures of any two or more thereof with or without diluents.

Many different types of compounds may be selected as lipophile groups which are to be reacted with the alcohol primary or secondary amines, principally compounds having lipophile radicals of relatively high molecular weight. For example, the following materials may be utilized as sources of lipophile groups: straight chain and branched chain carboxylic, aliphatic, and fatty acids, saturated and unsaturated, such as butyric acid, caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oil, whale oil, shark oil, partially or completely hydrogenated animal and vegetable oils such as those mentioned; hydroxy and alphahydroxy higher aliphatic and fatty acids such as 1-hydroxy stearic acid, dihydroxy stearic acid, alpha-hydroxy stearic acid, alpha-hydroxy palmitic acid, alpha-hydroxy lauric acid, alpha-hydroxy coconut oil mixed fatty acids, and the like; other substituted fatty acids such as

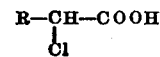

where R is a higher molecular weight hydrocarbon radical; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid, and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives such as amino, halogen, hydroxy, sulphate, sulphonic, phosphate and the like substitution and addition derivatives of the aforementioned carboxylic substances. It will be understood that mixtures of any two or more of said acids may be employed.

The alcohol primary and secondary amines or alkylolamines which provide the linkage between the lipophile group and the sulpho-carboxylic group may be selected from a large class and include symmetrical, unsymmetrical, normal and iso-derivatives, such as monoethanolamine, diethanolamine, mono-propanolamine, di-propanolamine, mono-butanolamine, mono-iso-butanolamine, mono-pentanolamine, mono-hexanolamine, mono-decylolamine, mono-laurylolamine, mono-hexadecylolamine, mono-octodecylolamine, mono-ethyl ethanolamine, mono-butyl ethanolamine, cyclohexyl ethanolamine, N-cyclohexyl butanolamine, ethanolaniline, alkylolamines of other monovalent or polyvalent alcohols such as glycols, glycerol, sugars, and sugar alcohols such as dextrose, sucrose, sorbitol, mannitol and dulcitol, alkylol polyamines such as alkylol derivatives of ethylene diamine, diethylene triamine and triethylene tetraamine, arylolamines and cyclic hydroxy amines such as N-phenyl ethanolamine, p-amino phenol,

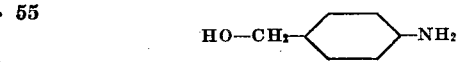

and the like. The alcohol or alkylol radicals of the alcohol amines or alkylolamines may contain substitutent groups such as amino, nitrile, carboxyl, hydroxy, halogen, sulphate, sulphonic, phosphate, and the like and the sequence of carbon atoms therein may be interrupted by O, S, C=O, NH, NR where R is lower alkyl, and the like.

From a study of the compounds which are listed hereinabove, those skilled in the art will understand that many different expedients may be employed for forming the compounds in so far as the dominant lipophile group and the relatively low molecular weight sulpho-carboxylic or fatty acid group are concerned. As stated, however, ester linkages are utilized between these two portions of the compound, and the skilled chemist will understand in general the most approved practices in securing this result. Numerous methods are also available for the introduction of the sulphonic acid group.

In the case particularly of aliphatic sulphonic acids, a reactive halogen may be caused to react with an alkali sulphite such as sodium sulphite, potassium sulphite, ammonium sulphite or lithium sulphite or some other sulphite in aqueous solution, if desired.

Another method is to introduce a sulph-hydryl or disulphite or some other suitable sulphur group and then oxidize to the sulphonic acid with nitric acid or a permanganate or some other oxidizing agent.

The preferred process comprises reacting a higher molecular weight carboxylic acid amide of an alcohol amine, containing at least one free or esterifiable hydroxy group, with a halogeno-carboxylic acid such as chloracetic or bromacetic acid, or with a halogeno-carboxylic acid halide such as chlor-acetyl chloride or bromacetyl bromide, to form a chloracetate or bromacetate, and then converting the latter into the sulphonic acid derivative by reaction with an alkali sulphite. Other halogeno-carboxylic acids or derivatives thereof which may be utilized are those derived from mono-, di-, and poly-carboxylic acids including, for example, iodo acetic acid, alpha-chlor propionic acid, alpha-chlor butyric acid, alpha-brom capric acid, mono-chlor succinyl chloride, di-chlor succinyl chloride, mono-chlor succinic acid, di-chlor succinic acid, mono- and di-brom glutaric acid and the corresponding glutaryl bromides, nitro-chloro-benzoyl chlorides, and the like. Of particular utility are the halogeno-acetic acids and their halides.

The following examples are illustrative of the preparation of compounds falling within the scope of the invention. It will be understood, of course, that said examples are given only by way of illustration and are not to be considered in any way limitative of the true scope of the invention. Thus, for example, other methods may be employed, the proportions of reacting ingredients and times and temperatures of reaction may be varied, and supplementary processes of purification may be resorted to wherever found desirable or convenient. These and other variations and modifications will be evident to those skilled in the art in the light of the guiding principles disclosed herein.

Example A (1) One mol of lauric acid and about 1½ mols of monoethanolamine were heated for 5¼ hours at a temperature of 150 degrees C.–222 degrees C. while continuously passing steam through the reaction mixture while maintaining the latter under reduced pressure, until the free fatty acids were decreased to 0.3%. The resulting product contained about 95% of the lauric acid amide of monoethanolamine. The product was washed free of the excess monoethanolamine with hot water, three washings being employed and each time the product was salted out with sodium chloride. An excess of ether was then added thereto, the mass was heated to the boiling point of the ether, anhydrous sodium sulphate was added thereto, the ether layer was poured off and the ether was then evaporated.

(1—a) In order to obtain essentially complete amidification with little or no ester formation and to form light-colored compositions at somewhat lower temperatures, the methyl or ethyl ester of lauric acid may be reacted with monoethanolamine at about 150 degrees C. to 180 degrees C. until the methyl alcohol or ethyl alcohol, as the case may be, formed in the reaction is volatilized.

(2) To 123 grams of the product obtained in part (1) hereof, 74 grams of chloracetic acid were added and the mixture was heated for 2 to 3 hours at 150 degrees C.–190 degrees C. The resulting product was then washed three times with hot water (80–90 degrees C.) until it was free of acid. The product was liquid at room temperature.

(3) To 66.4 grams of the washed product of part (2), 26.6 grams of potassium meta bisulphite ($K_2S_2O_5$), 13.3 grams of potassium hydroxide, 0.6 gram of potassium iodide, and 80 cc. of water were added and the resulting mixture was heated for 2 hours with stirring at 80 degrees C.–88 degrees C.

(4) To the product resulting from part (3) hereof, 6 volumes of isopropyl alcohol were added and the mixture was brought to a boil and then filtered to remove the inorganic salts. To the filtrate 3 more volumes of isopropyl alcohol were added, the solution was cooled in an ice bath, and the material which crystallized out was filtered off and dried. It was a hard, crystalline solid, light brown in color and had good wetting properties and other properties such as those described hereinafter.

Example B (1) 25 grams of the coconut oil mixed higher fatty acid amides of monoethanolamine (consisting largely of the lauric acid amide of monoethanolamine) and 11 grams of maleic anhydride were mixed together and heated to 100 degrees C. for a few minutes with stirring.

(2) 10 grams of the product resulting from part (1) hereof were mixed with 10 grams of potassium meta-bi-sulphite dissolved in 40 cc. of water (50 degrees C.) and the mixture was warmed to 60 degrees C.–70 degrees C., with stirring, for a few minutes. The mass became clear and homogeneous. It was a viscous liquid, soluble in water, and had excellent wetting and foaming properties. The reaction product comprises essentially a compound having the following probable formula:

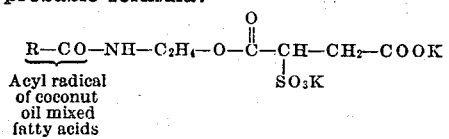

Example C 216 grams of the maleic acid ester of the coconut oil mixed fatty acid amides of monoethanolamine, 150 grams of sodium sulphite and 400 cc. of water were heated and stirred at a temperature from 60 degrees C. to 65 degrees C. for a period of about 10 minutes. The reaction mass was a paste which contained a substantial proportion of a compound having the following probable formula:

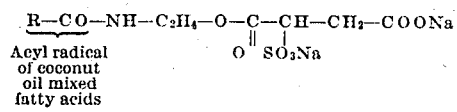

In order to make an effective hair shampoo from this composition, 690 cc. of water were added thereto, the product was cooled to 20 degrees C. and 55 cc. of a 30% solution of hydrogen peroxide were added in order to remove the excess sodium sulphite. The product was neutralized to a pH of 6.8 by adding 12.5 cc. of a 20% solution of sodium hydroxide. The final product was a clear solution which had excellent foaming and detergent properties. If desired, the product may be substantially diluted with water.

*Example D*

78.8 grams of the caprylic acid amide of monoethanolamine and 20 grams of maleic anhydride were slowly heated for 10 minutes to 100 degrees C. and then heated to 230 degrees C. for about one hour, under vacuum, whereby a compound having the following probable formula was produced:

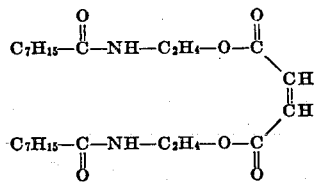

10 grams of this product were then heated with 20 grams of sodium bisulphite and 40 cc. of water for between 10 and 15 hours at a temperature of about 90 degrees C. until the mixture became water soluble. The resulting product, which was in paste form, had excellent foaming properties and comprised a substantial proportion of a compound having the following probable formula:

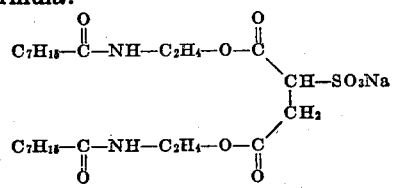

*Example E*

(1) 1051 grams of monostearin and 200 grams of monoethanolamine were mixed together and heated from 174 degrees C. to 250 degrees C. for a period of about 2 hours. The reaction product thus obtained was washed twice, in each instance with 20 pounds of boiling water, to remove excess or unreacted monoethanolamine and the glycerin which was set free in the reaction. In the first washing step, 45 cc. of concentrated hydrochloric acid were added to the wash water in order to neutralize the excess monoethanolamine and to facilitate the removal thereof by washing. In each instance, about 1 pound of common salt was added to the wash water in order to aid in salting out the compound. The resulting amide was dried at 150 degrees C.–160 degrees C. in an oven.

(2) 36 grams of the dried amide resulting from part (1) hereof were mixed with 11 grams of maleic anhydride and the mixture was heated up to 140 degrees C., with stirring, for a period of about 10 minutes.

(3) 11 grams of the reaction mass resulting from part (2) herein, 20 cc. of water, and 7.5 grams of sodium sulphite were heated at 70 degrees C.–80 degrees C. for about 10 minutes, with stirring. The resulting product comprised a white paste, soluble in water and having good foaming and surface tension reducing properties. It contained a substantial porportion of a compound having the following probable formula:

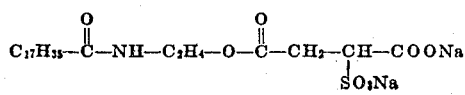

*Example F*

(1) 25 grams of diethanolamine were dissolved in 25 cc. of water and then 23 grams of lauroyl chloride were added dropwise, with stirring, the mass being cooled so that the temperature did not rise above about 30 degrees C. To the resulting reaction product, 1000 cc. of water were added and the mass was heated to 80 degrees C., common salt being added to the point of saturation. An oily layer formed on the top of the reaction mixture and was removed and then dissolved in ether. Anhydrous sodium sulphate was then added to the ether solution, the mass was filtered, and the ether evaporated. The residue contained predominantly the lauric acid amide of diethanolamine.

(2) 9.9 grams of lauric acid amide of diethanolamine, obtained as described in part (1) hereinabove, and 3.6 grams of maleic anhydride were heated to 80 degrees C., with stirring, after which the temperature spontaneously rose to 90 degrees C., the reaction mixture then being heated to 100 degrees C. and kept at such temperature for between 5 and 10 minutes.

(3) 12 grams of the reaction product from part (2) hereinabove, 20 cc. of water and 10 grams of sodium bisulphite were heated at a temperature of 55 degrees C.–60 degrees C. for about 10 minutes, with stirring; the resulting reaction product had good foaming and wetting properties.

(4) In order to eliminate excess sulphite present in the reaction product, 6 grams of a 30% solution of hydrogen peroxide were added dropwise, with stirring, the mass being maintained in an ice bath in order to prevent the temperature rising above about 35 degrees C. The reaction product was then neutralized with 8 cc. of a 20% solution of sodium hydroxide. The final product, which had good foaming and wetting properties, contained a substantial proportion of a compound or a mixture of compounds having the following probable formulae:

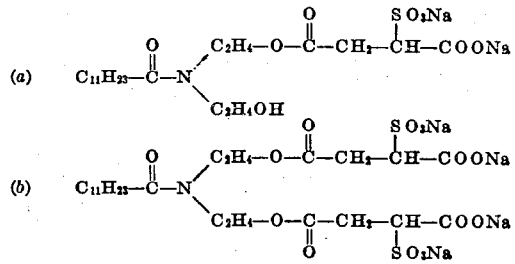

Those substances which are freely soluble in water may be recovered from their solutions in the customary manner by concentration and crystallization. As stated hereinabove, as the mass of the lipophile radical increases, solubility decreases and affinity for water is manifested by the dispersibility in water. From these dispersions, the substances may be readily recovered by "salting out" with suitable soluble electrolytes. Common salt is very satisfactory for this purpose in most cases. When salted out of an aqueous dispersion at temperatures ranging from 60 to 95 degrees C., the substances are obtained in the form of a paste with a water content ranging from approximately 25 to 75%. The more hydrophilic the substance, the greater the water content, and, of course, the salt is present in the water of the paste in approximately the same concentration in which it existed in the dispersion from which the paste was salted out.

Many of the compounds of the present invention may be represented by the general formula

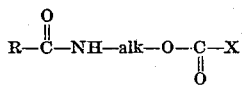

wherein

denotes an aliphatic acyl radical containing at least six carbon atoms and preferably from 12 to 18 carbon atoms, alk is alkylene, or (alkylene-O-alkylene)$_t$, $t$ being one, two three or more and

is a carboxylic acyl radical containing at least one sulphonic group.

Many of the compounds of the invention may also be represented by the general formula

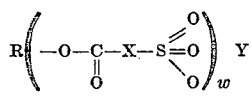

wherein R is a radical of an alcohol amine amidified with a carboxylic acid acyl group having at least four carbon atoms and preferably from twelve to eighteen carbon atoms, X is the carbon-hydrogen residue of the sulpho-carboxylic acid, Y is a cation, and $w$ is a small whole number, at least one.

At least many of the compounds of the present invention have utility in various arts in which interface modifying agents are employed. Many of them are resistant to precipitation by calcium and magnesium salts and are compatible with acid and alkali media. They may, in general, be utilized in washing and laundering and in the textile and related industries wherein they function for softening, wetting, detergent, emulsifying, penetrating, dispersing, frothing and foaming purposes. The textiles, various treatments of which in the presence of the agents of the present invention are rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of our invention may be placed is for the treatment of paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, as pickling inhibitors in metal cleaning baths, in shoe polishes, in rubber compositions, for breaking or demulsifying petroleum emulsions such as those of the water-in-oil type which are encountered in oil-field operations, and for various other purposes which will readily occur to those versed in the art in the light of our disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alcohol or alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl monomethanolamine sulpho-acetate, and the like; sulphuric and sulphonic derivatives of condensation products of alkylolamines and higher fatty acids; Turkey-red oils; compounds of the type of isopropyl naphthalene sodium sulphonate, and other classes of wetting agents.

It will be understood that the products may be employed in the form of impure reaction mixtures containing substantial proportions of the effective interface modifying agent or agents or, if desired, for any particular purposes, purification procedures may be employed to produce pure or substantially pure products. Those versed in the art are familiar with the types of purification methods which may be employed with advantage herein, particularly in the light of the disclosures made hereinabove.

In the event that the compounds of the invention are made by reacting the halogen derivatives with alkali sulphites or other soluble sulphites as well as thio-sulphates, the corresponding alkali sulphonic acid derivative will be produced. The term alkali is employed to include the ammonium radical (NH₄) When prepared by other methods so that the compounds contain the sulphonic acid group (—SO₃H), the hydrogen thereof may be replaced by other cations such as calcium, magnesium, aluminum, zinc, amines, alkylolamines such as mono, di- and triethanolamine and mixtures thereof, other organic nitrogenous bases such as pyridine and piperidine, tertiary amines, quaternary ammonium bases such as tetra-methyl ammonium hydroxide, etc., as described, for example, in the application of Morris B. Katzman, Serial No. 219,358, filed July 15, 1938, Patent No. 2,184,770, issued December 26, 1939. It will be understood that by the term "cation," as used throughout the specification and claims, is meant hydrogen and such other elements as are mentioned herein, and, in general, atoms or radicals which are regarded as bearing a positive charge or capable of replacing acidic hydrogen.

It will be understood that the selection of the particular halogen derivatives which may be utilized in the preparation of the products will depend upon certain factors. Thus, while bromo- and iodo- derivatives, in general, react slightly more rapidly than do the chloro- derivatives, the relatively cheaper cost of the latter will generally justify their use from a purely economic standpoint.

The term "residue," as used throughout the specification and claims, is employed in its ordinarily understood chemical significance. For example, where the hydroxyl groups of monoethanolamine is esterified with a sulpho-carboxylic acid and a hydrogen of the amino group of the monoethanolamine is replaced by the carboxylic acyl group of a higher fatty acid, that which remains of the monoethanolamine molecule, for example

—HN—C₂H₄— is the "residue" of the alcohol amine, in this case monoethanolamine.

Similarly, the term "carbon-hydrogen residue" of a sulpho-carboxylic acid is employed as in conventional chemical nomenclature. Thus, for example, if sulpho-acetic acid (HOOC—CH₂—SO₃H)

is esterified with monoethanolamine, the group —CH₂— is to be considered as the "carbon-hydrogen residue" of the sulpho-acetic acid.

Unless otherwise indicated, the term "higher," wherever employed in the claims, will be understood to mean at least eight carbon atoms and, concomitantly, the term "lower" will mean less than eight carbon atoms.

Whenever the term sulpho-carboxylic ester, sulpho-acetate, or the like expression is employed in the claims, it will be understood to cover the compounds irrespective of whether the hydrogen of the sulphonic acid is present as such or replaced by another cation.

This application is a continuation-in-part of our application Serial No. 222,150, filed July 30, 1938, Patent No. 2,178,139, issued October 31, 1939.

What we claim as new and desire to protect by Letters Patent of the United States is:

1. An alcohol amine in which amine hydrogen is replaced by an aliphatic carboxylic acyl radical containing at least four carbon atoms, and in which hydroxyl hydrogen is replaced by an aliphatic sulpho-carboxylic acid radical.

2. An alkylolamine in which one hydroxyl hydrogen is substituted by an aliphatic sulpho-carboxylic acid acyl radical containing from four to eight carbon atoms, and in which one amine hydrogen is substituted by a straight chain aliphatic carboxylic acid acyl radical containing from twelve to eighteen carbon atoms.

3. An alkylolamine in which one hydroxyl hydrogen is substituted by a sulpho-monocarboxylic acid acyl radical and in which one amine hydrogen is substituted by a fatty acid acyl radical containing from twelve to eighteen carbon atoms.

4. An alkylolamine in which hydroxyl hydrogen is substituted by a lower molecular weight sulpho-fatty acid acyl radical, and in which amine hydrogen is substituted by a straight chain aliphatic carboxylic acid acyl radical containing from twelve to eighteen carbon atoms.

5. An alcohol amine in which amine hydrogen is replaced by an aliphatic carboxylic acyl radical containing from twelve to eighteen carbon atoms, and in which hydroxyl hydrogen is replaced by an aliphatic sulpho-carboxylic acid acyl radical containing not more than eight carbon atoms.

6. Monoethanolamine in which one amine hydrogen is replaced by an aliphatic carboxylic acyl radical containing from twelve to eighteen carbon atoms, and in which the hydroxyl hydrogen is replaced by an aliphatic sulpho-carboxylic acid radical containing not more than eight carbon atoms.

7. Monoethanolamine in which one amine hydrogen is substituted by coconut oil mixed fatty acid acyl radicals and wherein hydroxyl hydrogen is replaced by a sulpho fatty acid acyl radical containing from two to four carbon atoms.

8. Monoethanolamine in which one amine hydrogen is substituted by a straight chain fatty acid acyl radical containing at least eight carbon atoms and in which one hydroxyl hydrogen is replaced by an aliphatic sulpho-mono-carboxylic acid acyl radical containing not more than eight carbon atoms.

9. A mono-hydroxy alkylamine in which hydroxyl hydrogen is substituted by an aliphatic sulpho-carboxylic acid acyl radical containing not more than eight carbon atoms, and in which one amine hydrogen is substituted by a carboxylic acyl radical containing at least eight carbon atoms.

10. A sulpho-carboxylic acid derivative in the form of a reaction product of a salt of sulphurous acid and the product resulting from the interaction of an aliphatic halogeno-carboxylic acid with a fatty acid amide of an hydroxy alkylamine, the fatty acid radical containing at least eight carbon atoms.

11. Chemical compounds having the formula

wherein

is an acyl radical containing at least eight carbon atoms, alk is a member selected from the group consisting of alkylene and alkylene-O-alkylene, t is a whole number, and

is a carboxylic acid acyl radical containing at least one sulphonic group.

12. Chemical compounds having the formula

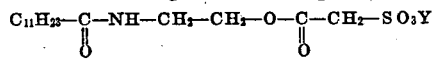

wherein Y is a cation selected from the group consisting of alkali metals, ammonia, and ethanolamines.

13. The process which comprises reacting a fatty acid amide of an hydroxy amine, the fatty acid radical containing from twelve to eighteen carbon atoms, by means of a member selected from the group consisting of lower molecular weight aliphatic halogeno-carboxylic acids and their acyl halides, and then reacting the resulting compound with a salt of sulphurous acid.

14. The process which comprises reacting a member of the group consisting of chloracetic acid, bromacetic acid, chloracetyl chloride, and bromacetyl bromide, with a carboxylic acid amide of an hydroxy aliphatic amine, the carboxylic radical containing a chain of at least four carbon atoms, and then reacting the resulting ester with an alkali sulphite.

15. The process which comprises reacting a higher fatty acid amide of monoethanolamine, the fatty acid radical of which contains from twelve to eighteen carbon atoms, with a halogenoacetic acid or acyl halide thereof, and then reacting the resulting compound with an alkali sulphite.

16. The process which comprises reacting an hydroxy amine to introduce a carboxylic acid acyl radical containing at least four carbon atoms in place of amine hydrogen of the hydroxy amine, and an aliphatic sulpho-carboxylic acid acyl radical in place of hydroxyl hydrogen of the hydroxy amine.

17. The process which comprises reacting monoethanolamine to introduce therein, in place of one amine hydrogen, a fatty acid acyl radical containing from twelve to eighteen carbon atoms, and, in place of hydroxy hydrogen of the monoethanolamine, an aliphatic sulpho-carboxylic acid acyl radical containing not more than eight carbon atoms.

18. An alcohol amine in which amine hydrogen is replaced by an aliphatic carboxylic acyl radical containing at least eight carbon atoms and in which hydroxyl hydrogen is replaced by a sulphocarboxylic acid radical.

ALBERT K. EPSTEIN.
MORRIS KATZMAN.